United States Patent [19]

Bicknell

[11] Patent Number: 5,196,081
[45] Date of Patent: Mar. 23, 1993

[54] A METHOD FOR A FRICTION FACING MATERIAL AND CARRIER ASSEMBLY

[75] Inventor: Graham R. Bicknell, Rugby, United Kingdom

[73] Assignee: Automotive Products plc, England

[21] Appl. No.: 488,050

[22] PCT Filed: Nov. 9, 1988

[86] PCT No.: PCT/GB88/00953
§ 371 Date: Jun. 8, 1990
§ 102(e) Date: Jun. 8, 1990

[87] PCT Pub. No.: WO89/05411
PCT Pub. Date: Jun. 15, 1989

[30] Foreign Application Priority Data

Dec. 9, 1987 [GB] United Kingdom ............... 8728804

[51] Int. Cl.$^5$ .......................................... B29C 47/06
[52] U.S. Cl. ........................... 156/244.11; 156/290; 156/291; 192/107 R; 192/107 M; 192/107 C
[58] Field of Search .................. 156/244.11, 245, 290, 156/291; 192/107 R, 107 M, 107 C

[56] References Cited

U.S. PATENT DOCUMENTS

| 3,231,058 | 1/1966 | Batchelor | 192/107 C |
| 4,529,079 | 7/1985 | Albertson | 192/107 C |
| 4,821,860 | 4/1989 | Crawford et al. | 192/107 C |
| 5,076,410 | 12/1991 | Maycock et al. | 156/291 |

FOREIGN PATENT DOCUMENTS

| 442539 | 8/1991 | European Pat. Off. | 192/107 C |
| 2822729 | 5/1978 | Fed. Rep. of Germany . | |
| 2812852 | 10/1978 | Fed. Rep. of Germany | 192/107 C |
| 611823 | 11/1948 | United Kingdom . | |
| 2191830 | 12/1987 | United Kingdom | 192/107 C |

Primary Examiner—Caleb Weston
Attorney, Agent, or Firm—Davis, Bujold & Streck

[57] ABSTRACT

A friction facing material and carrier assembly (2) to form a part of a driven plate of a friction clutch. The assembly (2) comprises a circular carrier plate (4) with resilient flexible paddles (14) at its periphery. Two annuli of friction material constituting friction facings (20,22) are each bonded by silicone rubber to opposite sides of the paddles. The silicon rubber on each side of the paddles is in the form of substantially continuous circular concentric strips of rubber substantially centered on axis (X) about which the assembly (2) is intended to rotate. The concentric strips (24A, 24B, 24C, 24D, 24E), bonding the friction facing (20) to one side of the paddles (14), are each preferably opposite the gap between two adjacent concentric stripes of rubber bonding the friction facing (22) to the other side of the paddles.

11 Claims, 3 Drawing Sheets

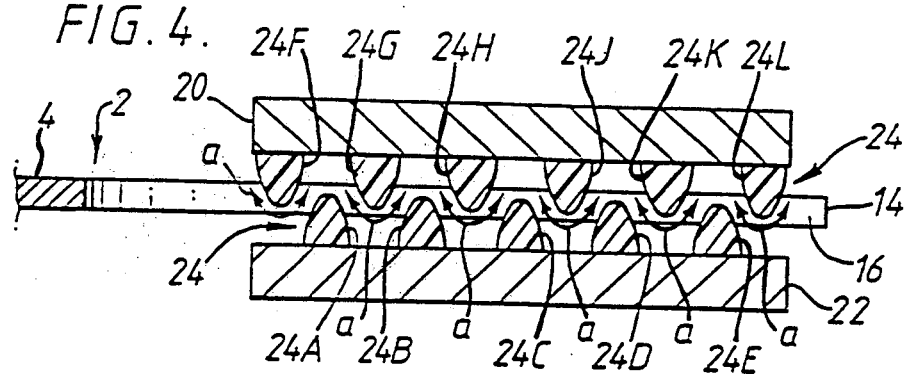
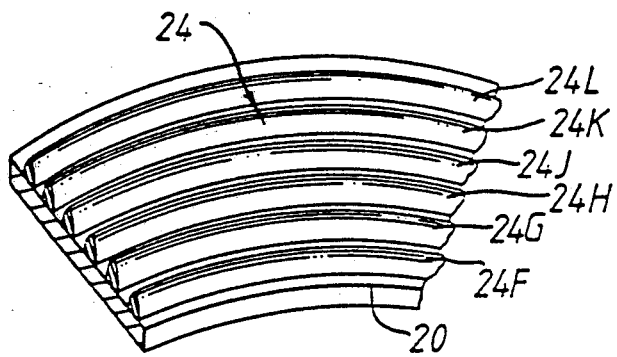
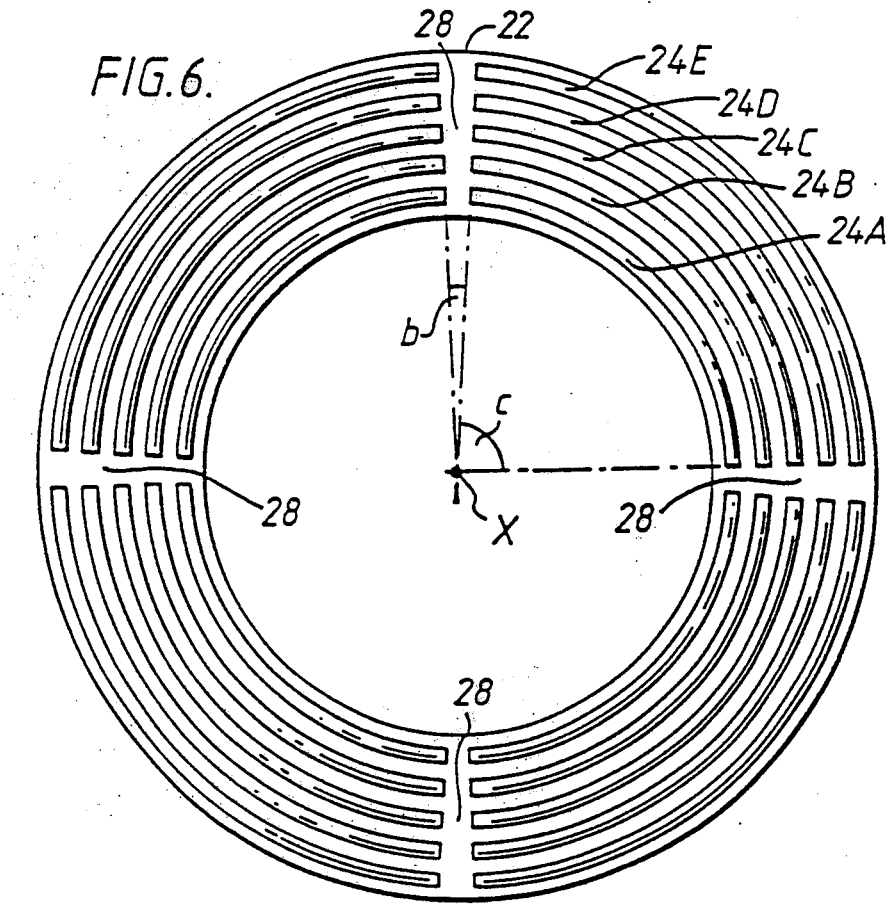

A METHOD FOR A FRICTION FACING MATERIAL AND CARRIER ASSEMBLY

This invention relates a friction facing material and carrier assembly for a clutch driven plate.

The driven plate may be used in a dry friction clutch.

In particular, though not exclusively, the clutch driven plate may be used in a clutch for a motor vehicle.

The friction facing and carrier assembly concerned is of a type (hereinafter called "the type referred to") comprising at least one annular array of friction material adhered to a carrier by elastomeric material, and in use said assembly being intended for rotation about a axis.

U.S. Pat. No. 4,529,079 discloses an assembly of the type referred to in which two continuous rings of friction material are adhered to opposite sides of a substrate, each ring of friction material being bonded to a respective side of the substrate by a plurality of small, discrete well spaced regions of elastomeric material in the form of dots or round blobs, or as rectilinear stripes extending radially of the ring of friction material, or as a combination of radial stripes and short rectilinear stripes extending tangentially of the ring. A drawback with the blobs and radial stripes in that, when the assembly is in use and torque is input thereto to rotate the assembly, the rotary force acting in shear on the regions of elastomer can peel or roll off each region of elastomer (starting initially at the trailing side of each region) from the facing material or the substrate thus weakening and possibly eventually destroying the bond between the substrate and the facing material. The same thing can happen when the regions of elastomer are a combination of the radial and short, rectilinear, tangential stripes as aforesaid.

An object of the invention is to provide an assembly of the type referred to in which said drawback is avoided or at least mitigated.

According to one aspect of the present invention a friction facing and carrier assembly of the type referred to is characterized in that said carrier is formed with one or more voids therethrough each spanned by said annular array of friction material and said annular array of friction material is bonded to said carrier by a plurality of stripes of said elastomeric material, each said stripe extending around said axis in continuous contact with the array of friction material, and radially of said axis said stripes being at least mainly spaced one from another.

According to a further aspect of the present invention a friction facing and carrier assembly of the type referred to is made by a method characterized in that an elastomeric material is applied to at least one array of friction material in the form of a plurality of stripes, each said stripe extending around said axis in continuous contact with the array of friction material, and radially of said axis said stripes being at least mainly spaced one from another, and said stripes are applied against a carrier which is formed with one or more voids such that each said void is spanned by said annular array of friction material, so as to adhere said array to said carrier.

By making the bonding stripes of elastomer substantially continuous, the region or each of the regions of elastomer constituting a said stripe is relatively long and tends not to be small. This increases the shear resistance in each region and thus provides enhanced resistance to bond failure.

Each said stripe may be a substantially circular stripe.

The circular stripes may be disposed as substantially concentric circles lying in a substantially common plane, said circles having substantially the same centre lying substantially on said axis.

In a preferred embodiment each said stripe is completely continuous.

Preferably at least one passage is provided which allows flow of gas into and out of a space between two adjacent said stripes of elastomeric material. During curing or vulcanising of the elastomeric material which causes the friction material to become bonded to the carrier, then each passage permits exposure (in said space) of the two stripes of elastomer to the ambient atmosphere which may be heated and/or comprise a mixture of gases and vapours intended to promote said curing, and, very importantly, the or each passage can allow the escape of gases emitted by the elastomeric material during the course of curing.

Although a porous, or microporous elastomer might be used, preferably the elastomer in an homogenous solid.

The elastomer may be a silcone rubber which vulcanises at room temperature so that distortion by vulcanization heating may be avoided.

The elastomer may have the following physical specification:

| Durometer shore A Hardness | 45 |
|---|---|
| Tensile strength | 28.12 Kg/cm$^2$ (400 psi) |
| Elongation | 300% |

The invention will now be further described by way of example, with reference to the accompanying drawings in which:

FIG. 4 is a section, on an enlarged scale, on line IV-IV in FIG. 1;

FIG. 5 is a fragment, on an enlarged scale, of a friction facing in the course of a method of making the assembly in FIG. 1;

FIG. 6 is a plan view of a friction facing with another array of stripes of elastomer to be used in a second embodiment of friction material and carrier assembly intended to form part of a dry friction clutch driven plate;

In the drawings like or comparable parts have the same reference numerals.

Figure 1:
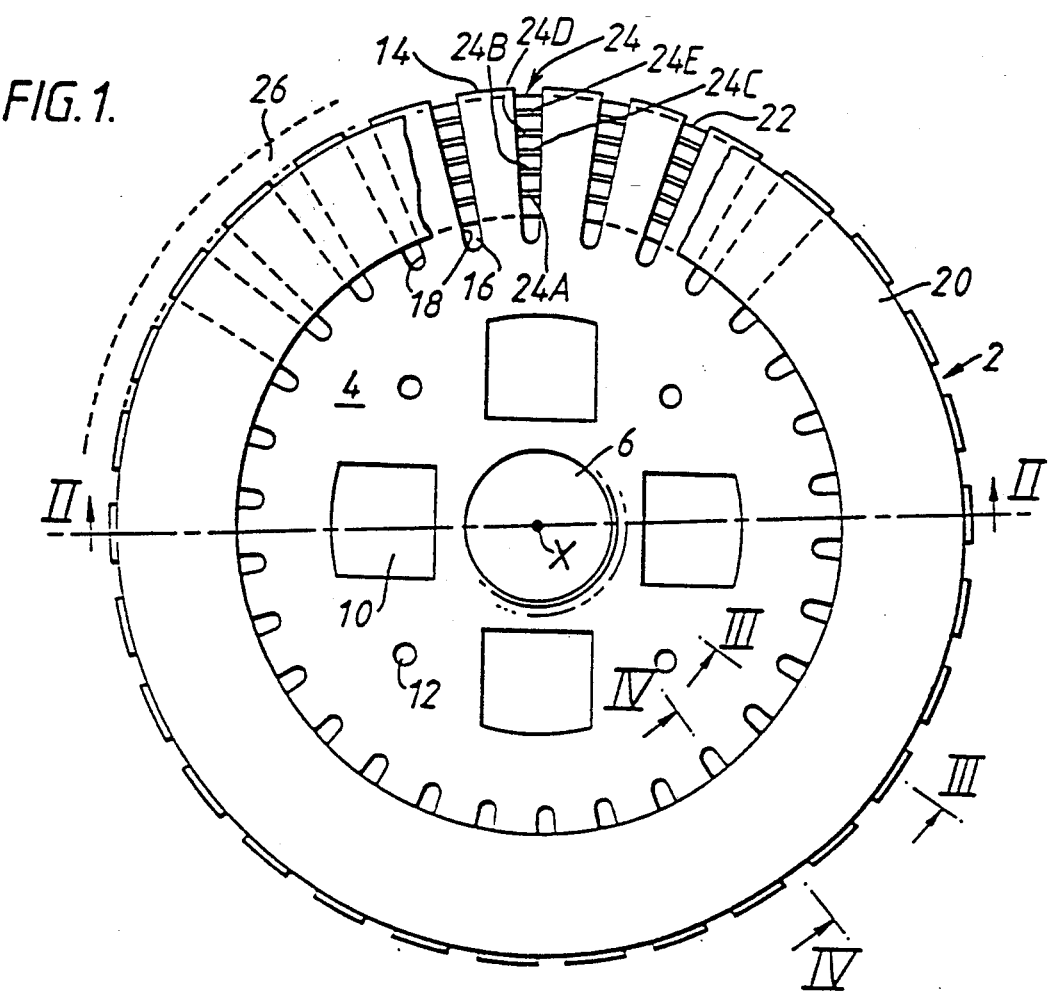
FIG. 1 is a plan view of a fragment of an embodiment of a friction material and carrier assembly formed according to the invention and intended to form a part of a dry friction clutch driven plate.
Figure 2:
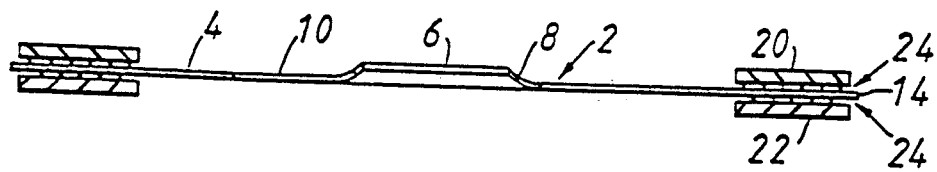
FIG. 2 is a section of line II—II in FIG. 1.

With reference to FIGS. 1 to 5 of the drawings a friction material and carrier plate assembly is shown at 2 intended to form part of a friction clutch driven plate which can be used in a clutch, for example, a diaphragm spring clutch which may be used, for example in a motor vehicle.

The assembly comprises a mainly flat steel carrier plate 4 of disc form centrally apertured at 6 to fit, for example, on an internally splined hub (not shown) known per se when the assembly is incorporated in a said driven plate. Aperture 6 is surrounded by a flared or Belleville marginal portion 8. Also the carrier plate is formed with windows 10 for torsional vibration damping springs (not shown) known per se and holes 12 for stop rivets (not shown) know per se.

At its periphery the carrier plate 4 has a plurality of outwardly projecting paddles or spokes 14 integral with the main body of the carrier plate. The spokes are flat being substantially co-planar with the main body of the carrier plate and are substantially equi-angularly spaced about a central axis X about which the assembly 2 is intended to rotate in use. Voids in the form of slots 16 space the spokes which have substantially radial opposite edges 18.

In the example shown there are thirty spokes 14 and thirty slots 16. Circumferentially each spoke 14 extends over about 7° of arc and each slot 16 over about 5°. If desired the number, size, shape and spacing of the spokes can be varied.

The spokes 14 are axially pliable in the sense of being leaf springs capable of flexing resiliently along directions substantially paralled to the axis X. This enables the carrier plate 4 at the spokes 14 to be sinuously flexible circumferentially.

Two substantially coincident and co-axial annular friction facings 20 and 22 are respectively bonded by an elastomeric material 24 to the opposite faces of each spoke 14. The elastomeric material 24 is adhered directly to faces of the friction facings 20, 22 and of the spokes 14. The elastomeric material is preferably a heat resistant synthetic rubber for example a silicone rubber. The rubber can be a room temperature vulcanising (called RTV) rubber. An example of such a silicone rubber is RTV 7057 produced and sold by Dow Corning. Another example is ELASTOSIL (Trade Mark) E14 produced by Waker-Chemi G.m.b.H, and a further example is RTV 159 produced by General Electric Company of the U.S.A. However a silicone rubber of the fluoro-silicone rubber kind may also be used.

Desirably the rubber is of a kind which can withstand temperatures experienced by friction facings in use without the rubber degrading to loose its necessary bond strength or resilience. It is believed that the rubber should be able to withstand temperatures from approximately −30° C. up to about 250° C., but an ability to withstand higher temperatures is thought desirable, for example up to about 300° C. or higher.

The eleastomeric material is applied in discrete, radially spaced amounts as continuous, concentric annular stripes or beads having substantially the same centre on the axis X. As can be seen more clearly in FIGS. 3 and 4 the circular stripes or beads A, 24B, 24C, 24D, 24E bonding the friction facing 22 to the paddles are opposite the spaces between the circular stripes or beads 24F, 24G, 24H, 24J, 24K, 24L, of the elastomeric material bonding the friction facing 20 to the paddles.

Each friction facing 20, 22 can be formed of any suitable friction material and may be of a non-asbestos type, but the facings are somewhat resilient such that each facing can flex or deform at least circumferentially The facings 20 and 22 may each be thin, for example 2.00 mm or less in axiall thickness. However the friction facings may be thicker than 2.00 mm.

Due to the sinuous flexibility of the carrier plate 4 and the resilient and flexible nature of the friction facings 20 and 22, the whole of the friction facings and carrier plate assembly 2 is sinuously flexible circumferentially at the spokes 14.

The layers of elastomer 24 provide resilient cushioning between the friction facings and the paddles 14 and an overall axial cushioning between the friction facings. The layers 24 can each be of an appreciable thickness so that that coupled with adequate flexibility and/or resilience of the friction facings will allow an appreciable local compression or axial compliance of the sandwich comprising both friction facings and elastomeric layers under an axial pressure applied to a relatively small area of each friction facing at any region of the whole area of the facing.

However when the assembly 2 forms part of a clutch driven plate in use in a motor vehicle clutch such as a diaphragm spring clutch, the subjective feel and quality of clutch re-engagements may be further enhanced by provision of further cushioning such as between the pressure plate and diaphragm spring and/or between the diaphragm spring and a clutch cover. That further cushioning may be a wavy wire fulcrum ring as in British Patent No. 1583403.

Since the elastomeric bonding material 24 is to be used in a clutch driven plate it has to have both the aforesaid resistence to degradation by heat and also have good shear strength in both the mass of the elastomeric material and in the bonds it forms between itself and the friction facings and paddles.

To manufacture a friction material and carrier plate assembly which is in accordance with the invention, the elastomeric material in a fluid or paste form can be sandwiched between the carrier plate and friction facings and whole subject to some axial pressure to ensure good area contact between the elastomeric material and respectively the carrier plate and friction facings, but preferably the friction facings are maintained a predetermined distance apart. For example removeable spacing means can be disposed between the carrier plate and friction facings to ensure the elastomeric material layer between the plate and a respective friction facing has at least a minimum desired thickness. Then the elastomeric material is cured or vulcanized to render it solid and the spacing means are thereafter removed.

Figure 3:
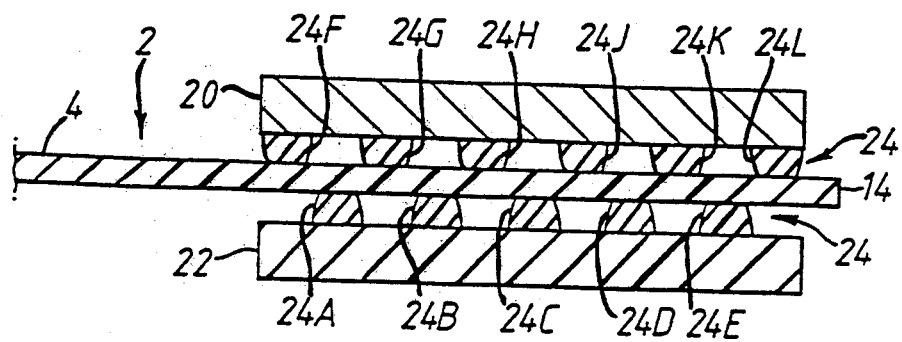
FIG. 3 is a section, on an enlarged scale, on line III—III in FIG. 1.

As shown in FIG. 5, during manufacture of the assembly 2 (FIG. 1) the elastomeric material is applied as a paste in the form of circular stripes, for example by a combing or extruding method, to each friction facing. Then the stripes on the facings are applied against the paddles 14 and vulcanized. In the case of an RTV rubber vulcanising is merely by subjecting the paste to the appropriate room temperature and humidity for sufficient time. For example RTV 7057 vulcanises in about forty-eight hours at a temperature of about 25° and about 50% humidity As shown in FIGS. 3 and 4 the elastomeric stripes attached to each friction facing do not extend through the slots 16 to the other friction facing, leaving at the slots 16 generally radially extending passages (such a passage being indicated in FIG. 4 by the double headed arrows a). Those passages allow gases, emitted by elastomeric stripes during curing of the elastomer, to escape. The passages also allow the ambient atmosphere to have full access to both complete opposite sides of each circular stripe of elastomeric material.

The stripes of elastomeric material in the embodiment in FIGS. 1 to 5 are in the form of continuous concentric circles. Instead of being substantially true circles each stripe may have some other form describing a closed figure, for example each stripe may have a wavy or sinuous or zig-zag form. Also the stripes may touch one another periodically.

The use of substantially concentric stripes of elastomer facilitates the assembly method and reduces the time in which the stripes are applied to the friction facings because each facing need merely be rotated about an axis to which a row of an appropriate number of elastomer extrusion nozzles is substantially radial. Thus the facing is quickly ready for application to the carrier plate and this reduces the chance of sufficient time elapsing which would allow a skin to form on the elastomer before the facing :,s applied to the carrier plate. This is an advantage because the formation of skin on the elastomer stripes before they are stuck to the carrier plate can reduce the shear strength of the elastomer bonds. Therefore when substantially concentric stripes of elastomer are used, the technique optimises the shear strength and allows a fast method of assembly to be used without skinning.

Instead of being completely continuous at least one of the stripes may have at least one interruption therein. The or each interruption subtends at axis X an angle of only a few degrees whereas any intact length of the stripe subtends at said axis an angle at least several times more than a few degrees, and where the stripe has a plurality of such interruptions the total agregate of the angles subtended by the interruptions does not exceed about 60°.

If desired, the carrier plate 4 may have an annular circumferential rim-portion 26 indicated in part in dotted lines with which the paddles 14 are integral so that the voids 16 are wholly surrounded by the material of the carrier plate 4.

In the embodiment shown in FIGS. 6 to 9, 2' indicates an alterntive friction facing and carrier assembly in which the friction facing 22 in bonded to the paddles 14 by concentric circular stripes of elastomeric material 24A, 24B, 24C, 24D and 24E which have short interruptions 28 therein. At the axis X each interruption 28 subtends an angle b, and each intact length of each stripe of elastomer subtends at angle c at the axis X. Angle b is only a few degrees, in this example about 5° and is substantially equal to the circumferential angular span of each slot 16. Angle c is several times greater than b, in this example angle c is substantially 85°. In this example the aggregate value of the angles b does does not exceed about 20°.

Figure 7:
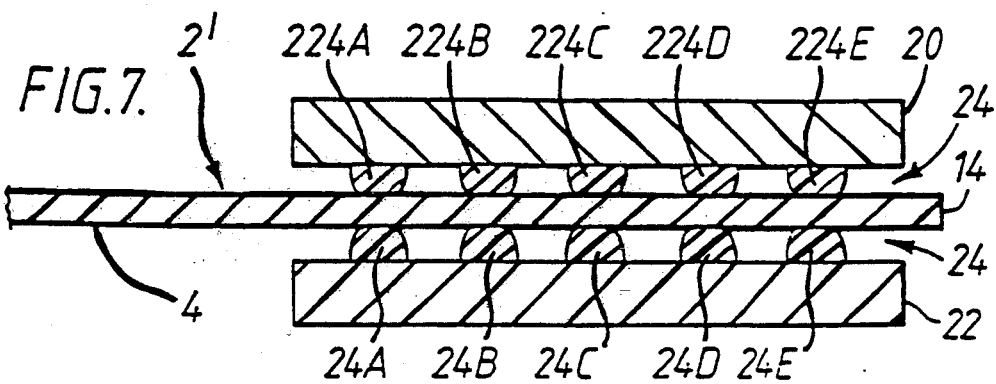
FIG. 7 is a section comparable to FIG. 2 but of the second embodiment.
Figure 8:
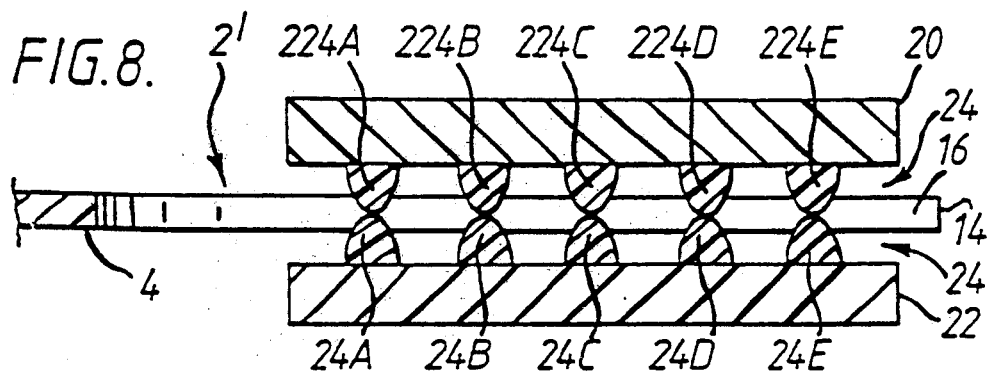
FIG. 8 is a section comparable to FIG. 3 but of the second embodiment.
Figure 9:
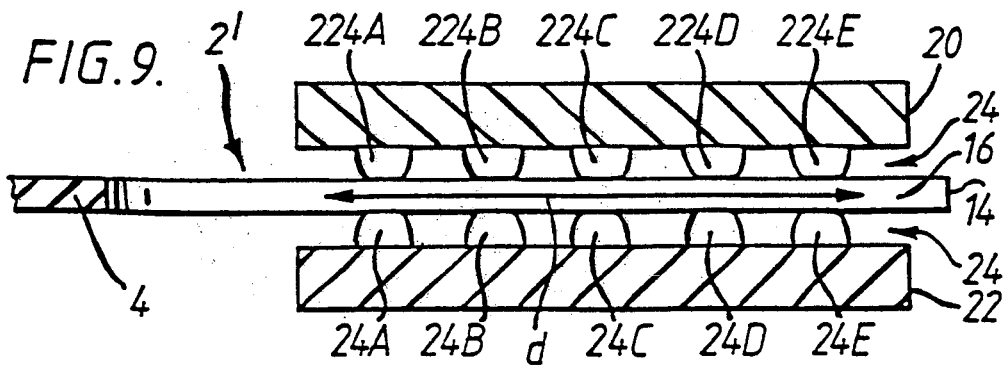
FIG. 9 is a section of the second embodiment, similar to FIGS. 7 and 8, but at an interruption in the stripes of elastomeric material.

The friction facing 20 has a array of concentric stripes of elastomer 224A, 224B, 224C, 224D and 224E similar to that in the facing 22. Thus as shown in FIGS. 7 to 9 each stripe of elastomer on one friction facing is substantially opposite a said stripe of elastomer on the other friction facing so that at most voids or slots 16 the stripes of elastomer on the facing 20 unite with the corresponding stripes of elastomer on the facing 22 as shown in FIG. 8. However the interruptions 28 in the elastomer on one friction facing are opposite the interruptions in the elastomer on the other facing and coincide with certain ones of the slots 16 as shown in FIG. 9. Thus in the assembly 2' four substantially radial passages exist (one indicated in FIG. 9 by double headed arrow d) for the free passage of gases between the ambient atmosphere and the arcuate chambers between adjacent stripes of elastomer on each friction facing. In a modification at least one stripe of elastomer on one friction facing can be opposite a space between two adjacent stripes of elastomer on the other facing.

A said interruption 28 in a said stripe of elastomer need not coincide radially with an interruption in another elastomer stripe. Instead, in first and second radially adjacent stripes an interruption (the initially mentioned interruption) in the first stripe can be off-set or staggered circumferentially from an interruption (the latterly mentioned interruption) in the second stripe wherein of any interruptions in the second stripe said latterly mentioned interruption is the more adjacent circumferentially to the initially mentioned interruption. But if the elastomer stripes on one friction facing are opposite the elastomer stripes on the other facing, then at least one interruption in a radially innermost or outermost stripe should coincide with a said void 16.

I claim:

1. A method of forming a bonded friction facing material and carrier assembly for a clutch driven plate rotatable about an axis, the assembly comprising a carrier formed so as to define at least one void, at least one array of friction material, and elastomeric material, the method comprising the steps of:

applying the elastomeric material to said one array of friction material in the form of a plurality of stripes such that each said stripe extends around said axis in continuous contact with said one array of friction material, and radially of said axis, said stripes being at least mainly spaced one from another; and applying said stripes against the carrier such that said at least one void is spanned by said one array of friction material, so as to adhere said one array of friction material to said carrier.

2. A method according to claim 1 wherein each said stripe is completely continuous.

3. A method according to claim 1 wherein the carrier has opposite side and the elastomeric material is applied to the two annular arrays of friction material and each is adhered to a respective opposite side of the carrier.

4. A method according to claim 1 wherein each said stripe is substantially circular.

5. A method according to claim 4 wherein the stripes are disposed as substantially concentric circles lying in a substantially common plane, said circles having substantially the same centre lying substantially on said axis.

6. A method according to claim 1 wherein the elastomeric material is applied as a paste.

7. A method according claim 6 wherein said stripes are formed by combing.

8. A method according to claim 6 wherein said stripes are formed by extruding.

9. A method as claimed in claim 8 wherein at least one of said stripes is formed with at least one interruption therein.

10. A method as claimed in claim 8 wherein the stripes of elastomeric material are concentric with one another and applied to said one array of friction material by a row of extrusion nozzles, each stripe being applied by a respective nozzle.

11. A method as claimed in claim 10 wherein said one array of friction material is rotated about its axis as the elastomeric material is extruded through the nozzles.

* * * * *